G. W. CHANDLER.
Apparatus for Binding Grain.
No. 99,404. Patented Feb. 1, 1870
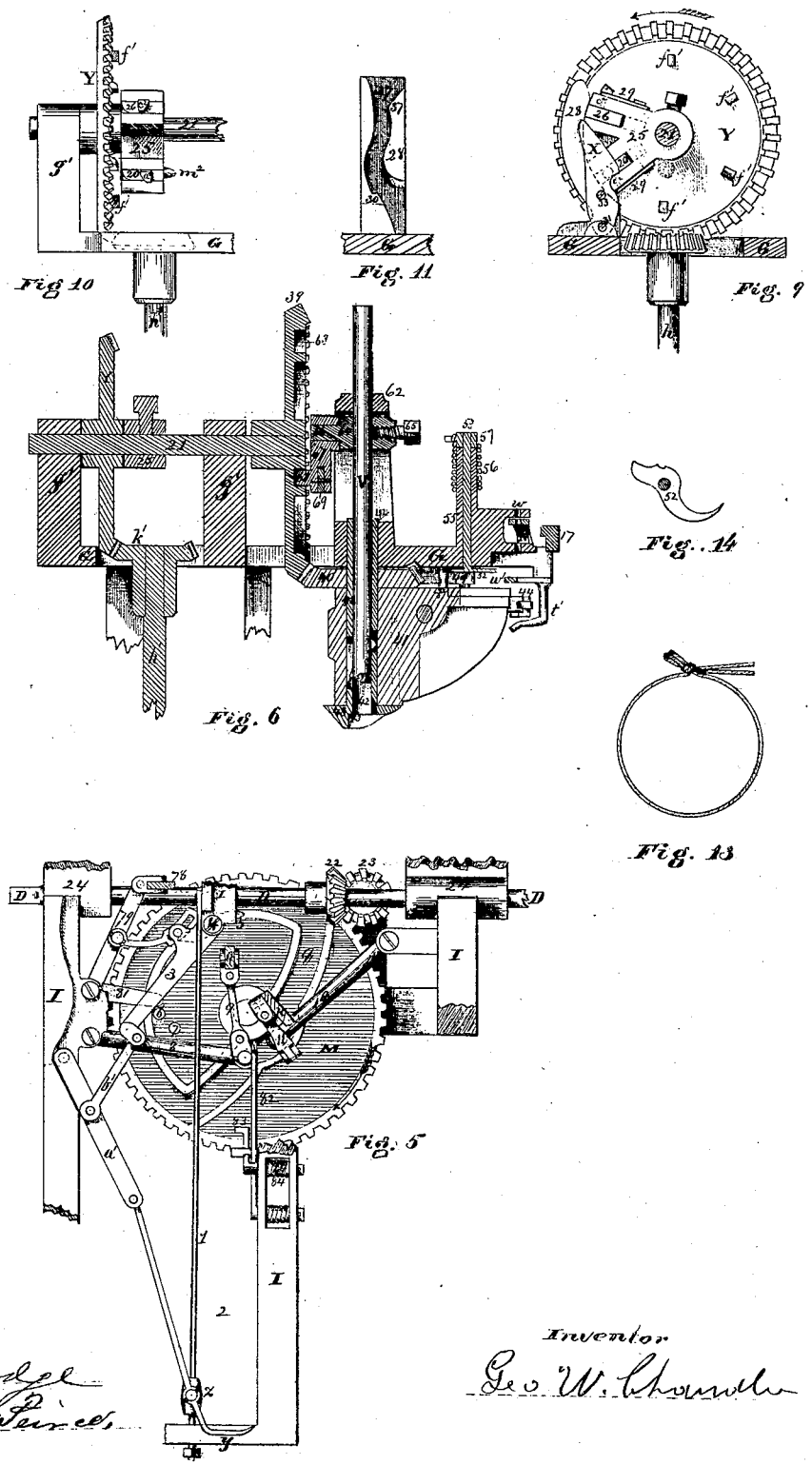
Witnesses
Thos. H. Dodge
Albert E. Pierce
Inventor
Geo. W. Chandler

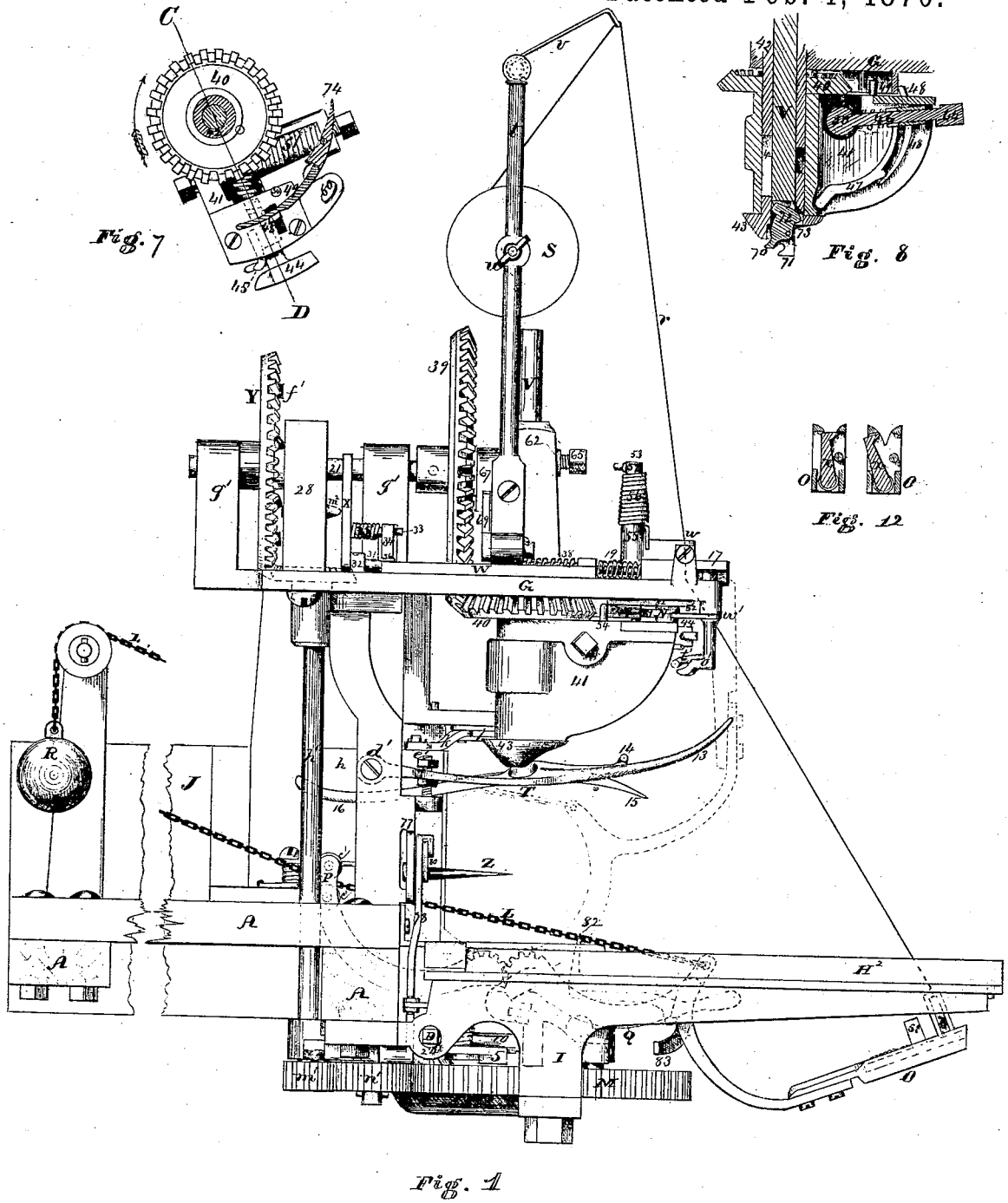

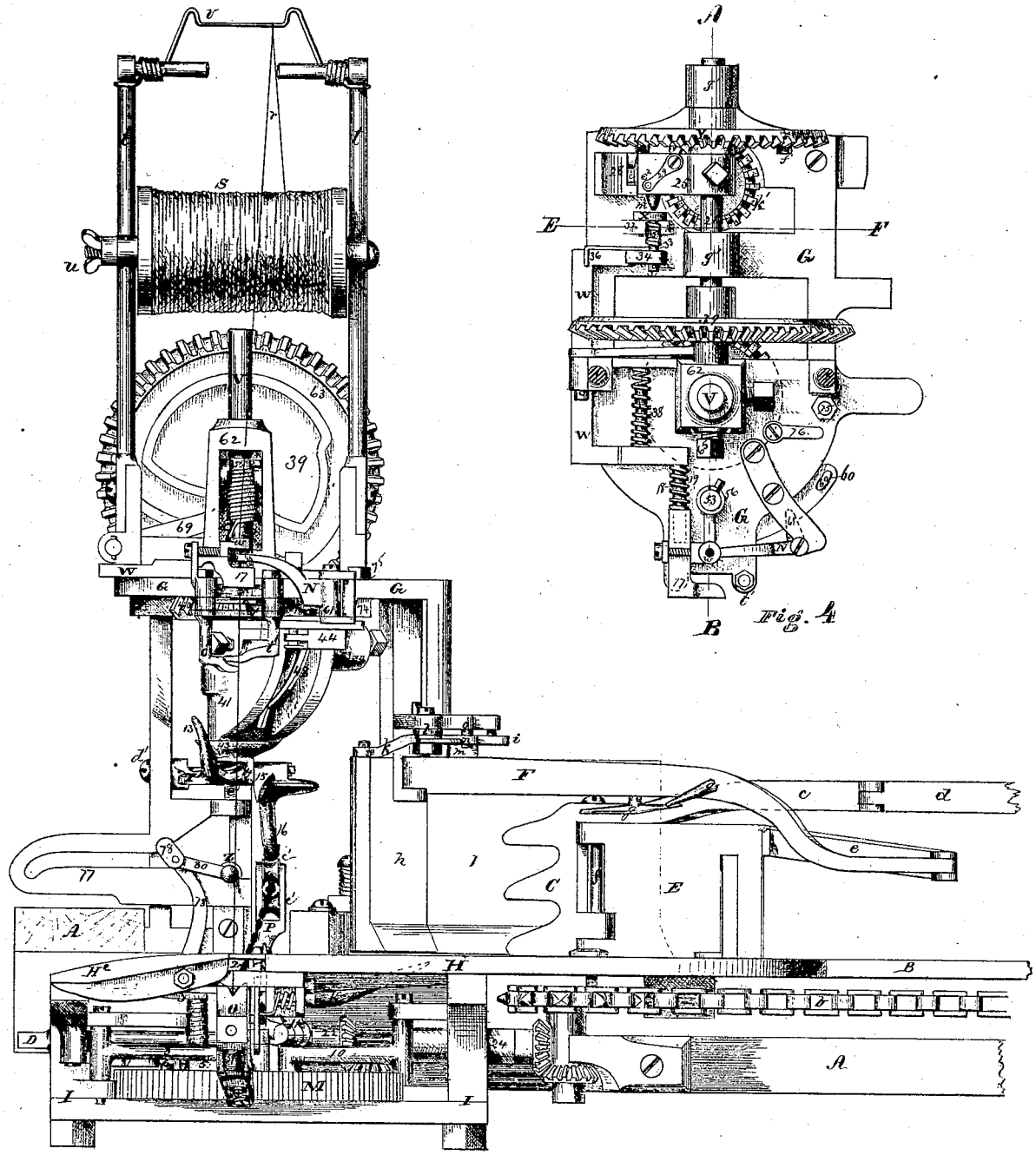

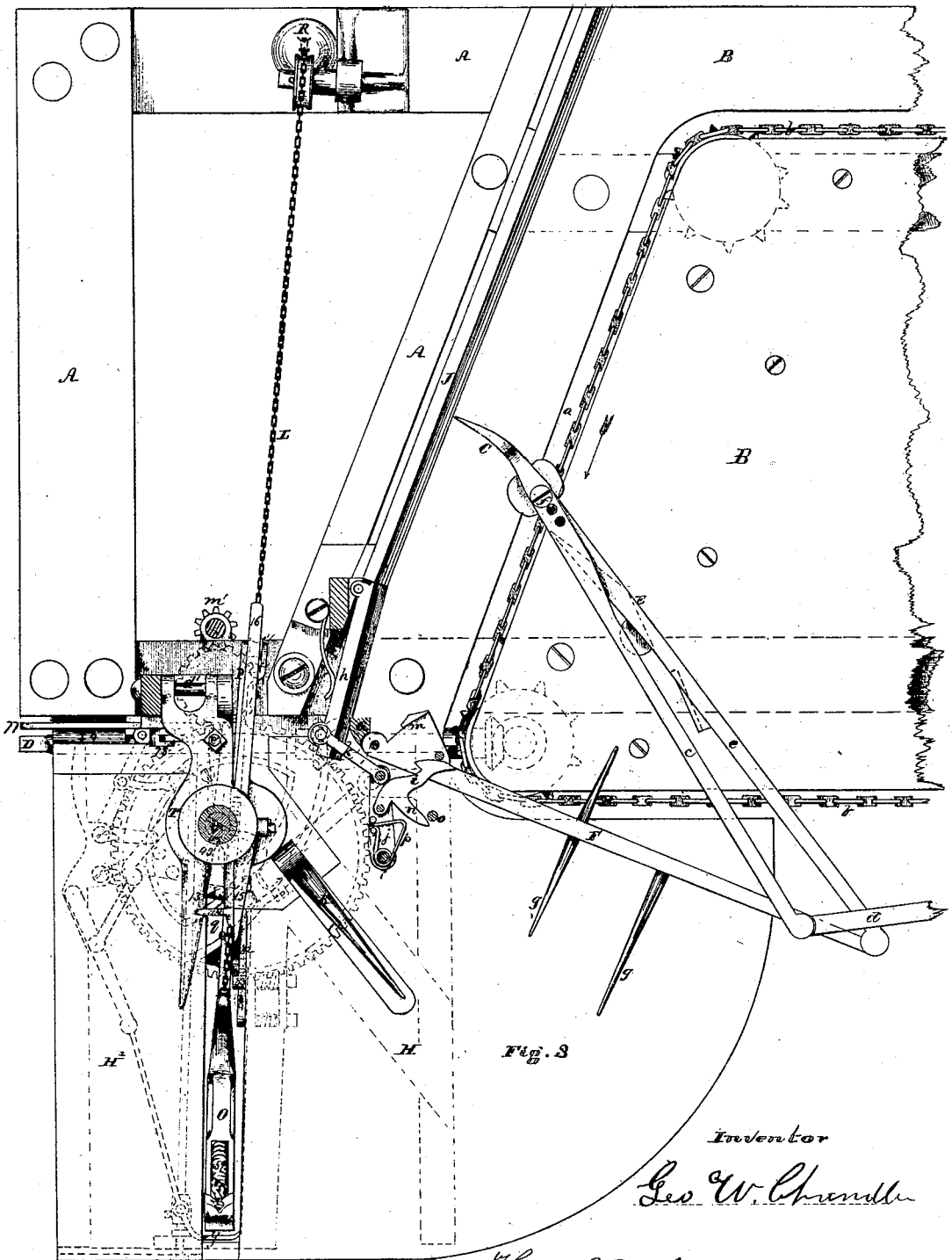

UNITED STATES PATENT OFFICE.

GEORGE W. CHANDLER, OF MASON, NEW HAMPSHIRE, ASSIGNOR TO HIMSELF, HENRY I. WHITNEY, OF SAME PLACE, AND ALBERT A. WHITNEY, OF BATTLE CREEK, MICHIGAN.

IMPROVEMENT IN APPARATUS FOR BINDING GRAIN.

Specification forming part of Letters Patent No. 99,404, dated February 1, 1870.

*To all whom it may concern:*

Be it known that I, GEO. W. CHANDLER, of Mason, county of Hillsborough and State of New Hampshire, have invented certain new and useful Improvements in Machines for Binding Grain; and I do hereby declare that the following is a full, clear, and exact description of the same, reference being had to the accompanying drawings, forming a part of this specification, in which—

Figure 1 represents a side view of my machine for binding grain. Fig. 2 represents a rear view. Fig. 3 represents a plan view of the lower portion of the machine. Fig. 4 represents a plan view of the upper portion of the machine. Fig. 5 represents a plan view of the parts of the machine below the platform. Fig. 6 represents a longitudinal section of the upper part of the machine at line A B, Fig. 4. Fig. 7 represents a plan view of the tying device. Fig. 8 represents a vertical section of the tying device at line C D, Fig. 7. Fig. 9 represents a transverse section of the upper portion of the machine at line E F, Fig. 4, showing a front view of the clutch. Fig. 10 represents a side view of the clutch with the guide removed. Fig. 11 represents a view of the inner side of the clutch-guide. Fig. 12 represents sections of the end of the band-holder, the catch being shown in two positions. Fig. 13 represents the knot in the band as tied by the machine; and Fig. 14 represents the knife for cutting the twine for the bands.

To enable those skilled in the art to which my invention belongs to make and use the same, I will proceed to describe it more in detail.

In the drawings the parts marked A represent so much of the frame of a reaping-machine as is necessary to illustrate my present invention. Upon the frame A is arranged the main grain-platform B in the usual manner. Around the platform B is formed a groove, $a$, in which travels the guide of the rake C, which is carried around the platform by means of an endless chain, $b$, for the purpose of collecting the grain as it falls upon the platform, and forming it into bundles or gavels preparatory to its being bound.

The chain $b$ is constructed and arranged in the usual manner, it being supported at the corner of the platform upon spur-wheels, one of which is operated by means of bevel-gears from the driving-shaft D, and from which the rake derives its motion, as fully indicated in the drawings.

The rake C is furnished with an arm, $c$, the rear end of which is connected by a rod, $d$, to a standard that is fixed at the right-hand rear corner of the grain-platform B in the usual manner.

To the rake C, as above described, I add a movable rake-board, E, attached to an arm, $e$, and pivoted at its front end to the rake C by a rod or bolt, $f$, while the rear end of its arm $e$ is hinged to a swinging lever, F, that has its opposite end pivoted to a hanging portion of the frame G.

The swinging lever F is furnished with one or more protecting-fingers, $g$, to prevent the grain from being thrown out of place while it is being transferred from the main grain-platform B, and deposited upon the auxiliary platform H, where it is supported during the operation of binding.

The auxiliary grain-platform H is arranged in the same horizontal plane as the main platform B, and is supported upon the frame I of the binder, said frame being securely attached to the frame A of the reaper at its left-hand rear corner, as shown in the drawings.

At the left-hand side of the main grain-platform B, and extending from its front to rear, is a grain-board, J, the rear end $h$ of which is hinged in such a manner that it will swing back as the grain is carried against it by the rake C, after which it is drawn forward to assist in turning the gavel to the proper position upon the platform H. The movable end $h$ of the grain-board is drawn forward by means of a dog, $i$, pivoted to a lever, $j$, one end, $l$, of which is secured to a portion of the frame G, the other being connected by means of a rod, $k$, to the upper edge of the movable end $h$ of the grain-board.

The dog $i$ is arranged so that it catches upon a projection, $m$, on the swinging lever F, when the latter is brought around to place the grain upon the binder, and when the lever F starts upon its backward motion the dog $i$, together with the lever $k$ and end $h$ of the grain-board, are drawn forward until the projection $n$ of the dog $i$ strikes a pin, $o$, projecting down from the frame G, which throws the dog $i$ off from the projection $m$, and relieves the parts attached thereto from further motion. A spring, $p$, is arranged to press the dog $i$ forward and insure its operation.

The grain is collected upon the main platform B by the rake C, and is carried along the grain-board J and onto the platform H, where the gavel is turned partly around by the rake-board E, when it is received by a fork, K, that swings upward through the platform H, in rear of the gavel, and, in connection with the movable end $h$ of the grain-board, turns the bundle squarely across the compressing-chain L, beneath the tying device.

The fork K is operated by means of a grooved cam, $q$, in the side of the gear M, beneath the platform H.

The twine $r$, with which the grain is to be bound, is contained upon a spool, S, supported between the standards $t$ at the top of the machine. A set-screw, $u$, is arranged at one end of the shaft, upon which the spool is hung, by means of which the tension of the twine may be regulated, and a spring, $v$, is secured to the top of the standard $t$, over which the twine is drawn, and is, by the flexibility of said spring, prevented from being broken by any sudden pull which it might receive while working the machine.

The twine after passing over the spring is threaded through an eye, $w$. in a projection at the front end of the frame G, then through an eye in the end of the band-tightener N, after which it passes through an eye in the end of frame G, that is directly beneath the eye $w$, as before named. The twine is here caught by the catch-finger $x$, in the end of the band-arm O, by means of which the end is drawn down beneath the platform H to the position shown in Fig. 1 of the drawings. A hook, $y$, is arranged for drawing the band forward and beneath the tying device, which operation is performed previous to the arrival of the gavel, which latter is consequently placed across the band when moved up by the rake-board E and fork K.

The shank of the hook $y$ is pivoted to a slide, $z$, which moves upon a rod, 1, arranged across the frame I, beneath the platform H, parallel to the opening 2 through which the band-arm O descends, as shown in the drawings, Fig. 5, and by dotted lines in Fig. 3. The extreme end of the shank of hook $y$ is pivoted to the end of a lever, $a^1$, that has its fulcrum on the frame I, and which is connected near its center by a rod, $b^1$, to the outer end of a swinging arm, 3, which arm is pivoted to the front part of the binder-frame I, as shown at 4, Fig. 5, and provided with a dog, 5, that engages with pins 6 and 7 on the wheel M, and by means of which the arm 3 is operated, together with the parts connected thereto, pin 6 throwing the arm 3 forward and pin 7 throwing it back, thereby giving to the parts a positive motion.

When the bundle or gavel is in proper position on the auxiliary or binding platform H, two curved inclosing-arms, P and Q, swing upward from beneath to the position shown in dotted lines, Fig. 1, inclosing the bundle, and bringing the compressing-chain L around it, which latter, being drawn taut by the weight R, compresses the bundle tightly together, in which position it is held until the band is tied. The inclosing-arms P and Q are pivoted on the central bar of the binder-frame I, and are caused to operate simultaneously by being provided with segment-gears that mesh into each other, (see dotted lines, Fig. 1,) their motion being imparted to them by the groove-cam $q$ on the top of wheel M, as follows: Pivoted to the left-hand bar of the frame I is an arm, 8, which extends over the wheel M, as shown in Fig. 5, and has fixed to its opposite end a pin or roll that works in the cam-groove $q$, while it is also connected by means of the rod 9 to a downward-projecting portion of the compressing-arm Q, double joints being used at the junction of the parts to insure free action.

The band-arm O is made with the compressing-arm Q, and both are operated at the same time by the cam $q$, as is also the compressing-arm P, the latter being moved by the segment-gears.

The operating mechanism of the fork K is arranged in a similar manner at the opposite side of the wheel M, it being arranged with an arm, 10, and connecting-rod 11, by means of which it is joined to a downward-projecting shank to the fork $k$.

The end of the compressing-chain L is secured to the end of the rear inclosing-arm Q, and is rove through between the pulleys $c^1$ in the end of the front inclosing arm P, so that the arms Q and P, in rising, draw the chain around the bundle or gavel, which is thereby drawn compactly together, and at the same time pressed upward against the guard T while the knot in the band is being tied. The guard T is secured by the pivot-bolt $d^1$ to one of the upright standards which support the frame G, and may be adjusted up or down by means of two nuts on the bolt $e^1$. A hole is formed through the guard T, beneath the center of the tying device, into which descends the end of the knot-former V, while it is provided with fingers 13 and 14, between which the band is drawn to retain it in proper position at the central part of the gavel. At the right-hand side of the guard T is arranged a movable protecting-finger, 15, pivoted to the side of the guard T, near its central part, with its shank 16 extending forward and resting upon the top pulley $c^1$, in the end of the inclosing-arm P. The shank 16 of the projecting finger overbalances its point, and is raised by the inclosing-arm P, thereby causing the point of the finger to be depressed to meet the arm Q when the inclosing-arms are raised, for the purpose of catching any stray straws that may project in front of the gavel, and guide them between the arms, and when the arms Q and P are depressed, the weight of the shank 16 causes the point of the finger to rise out of the way of the next gavel.

When the band-arm O is raised to the position shown in dotted lines, Fig. 1, its upper end strikes against the head-piece 17 of the shipper-bar W, and forces the former against spring 19 on stud 18, which projects from the shipper-bar W, thereby pressing the spring 19 sufficiently to compress spring 38, and force forward the shipper-bar W. The shipper-bar is furnished at its front end with a latch-piece X, which presses against the spur $m^2$ on the rear edge of the first clutch-dog 20, which is thereby moved forward to engage with one of the pins $f'$ on the gear Y, and thereby put into operation the mechanism for tying the band. The gear Y is hung upon and allowed to turn loosely on a shaft, 21, that is supported in the bearings $g'$ above the frame G, while motion is transmitted to said gear Y from the upright shaft $h'$ by a bevel-gear, $k'$, at its upper end, which meshes into the aforesaid gear. At the lower end of shaft $h'$ is a spur-gear $m^1$, connected with the spur-gear M by the intermediate gear $n'$. The wheel M is operated from the driving-shaft D by the miter-gear 22 and miter and spur gear 23.

The driving-shaft D is hung in bearings 24 upon the frame I, and receives its motion from the main wheels of the reaper, the power being transmitted through any suitable arrangement of intermediate shafts and gears.

The clutch device is shown more fully in Figs. 9, 10, and 11 of the drawings. It consists of a segment, 25, rigidly attached to the shaft 21, and furnished with two dogs, 20 and 26, pivoted at their inner ends in slots in the segment 25, as indicated in dotted lines, Fig. 9. They are provided at their outer ends with projections $a^2$ and $c^2$, the former being beveled on its front side and the latter on its rear side, as indicated in Fig. 10. The projections are made to fit the groove 27 on the inner side of the stationary clutch-guide 28, the form of which is shown in Fig. 11. Springs 29 are attached to the outside of the segment 25, having in their ends pins $e^2$, which extend through the sides of the segment and press against the sides of the dogs 20 and 26, in each of which are formed two depressions, one set receiving the points of the pins $e^2$, when the dogs are out, and the other set when the dogs are in, thereby preventing them from working out of place by the shock and jar of the machine when in operation. The clutch-guard 28 is curved to conform to the circle through which the segment 25 travels, and a notch, 30, is formed at one side of the groove 27, upon which the projecting end $a^2$ of the first dog 20 catches when the shaft 21 has completed its revolution, and by which it is stopped.

It being important to have the shaft 21 and segment 25 stop at and start from a given point at each revolution, the clutch device above described has been devised, and which accomplishes the object in a very perfect and satisfactory manner. The result is due to the use of the two dogs 20 and 26, in combination with the groove 27 and stop-notch 30. The first dog, 20, is thrown out of clutch with the pins $f'$ at the point 37 of the guide 28, when the motion of the shaft 21 and segment 25 is continued, by the action of the pins $f'$ on the second dog, 26, until that, also, reaches the point 37, when it will be thrown out of clutch, and the projection $a^2$ at the same moment striking against the notch 30, stops all further motion of the shaft 21 and segment 25 until the first dog, 20, is again thrown off from the notch 30 by the latch-piece X.

The latch-piece X is combined with the front end of the shipper-bar W in the following manner: It is fastened to the front end of a journal-pin, 31, which passes through an ear, 32, on the top of frame G, and also through the front inwardly-projecting arm of the shipper-bar W. A second pin, 33, is secured to the latch-piece X above the journal-pin 32, and parallel therewith, which projects back through a slot formed in the vertical projection 34 on the front end of the shipper-bar W. The latch-piece X is held to the vertical projection 34 by a fastening, which passes down through both of the pins 31 and 33 at the back side of the aforesaid vertical projection.

The latch-piece X is forced inward toward the shaft 21 by a coil-spring, 35, arranged around the pin 33, one end of the spring being firmly secured in the side of the latch-piece, while the other end, 36, extends outward, and is bent back so as to rest and slide upon the front part of the shipper-bar W, (see Figs. 1 and 4,) which admits of the latch-piece being forced back by the spur $m^2$ striking against the inner beveled edge as it passes down to the position shown in Fig. 9.

As soon as the band-arm O descends and releases the pressure from the head-piece 17 of the shipper-bar W, spring 38, which is arranged on a projecting arm of the shipper-bar W, with one end resting against a flange or portion of the frame G, forces the shipper-bar back, when the latch-piece X is released from and thrown forward of the spur $m^2$, as shown in the drawings.

The object of spring 19, which is stronger than spring 38, is to prevent breaking of the machine in case the dog 20 should happen to strike squarely upon the end of one of the pins $f'$ during the operation of shipping, and thus prevent, for the time being, any forward motion of the shipping-bar W, in which case the head-piece 17 will slide over the stud 18, the spring 19 being compressed.

Upon the rear end of the shaft 21 is secured a gear, 39, which meshes into a gear, 40, at the top of the tier 4, and by means of which the tier is operated. The tier is hung and turns on a stationary hollow spindle, 42, the top end of which is secured in the frame G, and the lower end of which is provided with a flanged head, 43, upon which the tier is supported. The flanged head is beveled off at its lower side, as shown in the drawings, so as to properly guide the band around the knot-former V as the tier moves around it.

The tier 41 is set in motion, as before stated, by means of the band-arm O, that operates the shipper and throws the first dog 20 into clutch with the pins $f'$ on the gear Y. The band-arm O also carries up the end of the band to the point where the twine $r$ passes through the eye in the frame G, thereby bringing both ends of the band together, where it is held until seized by the band-holder 44.

The band is retained in proper position to be caught by means of a pair of steadying-fingers, $o'$ and $t'$, secured to the rear end of the frame G, and bent so that their ends cross, one slightly above the other, and in such a manner that the band, after being caught by the band-holder 44, can, by the motion of the tier, be readily drawn from between them.

An angular guard, $w'$, is also arranged between the upper part of the fingers $o'$ and $t'$, which also assists in keeping the twine in proper position.

The band-holder 44 is provided with a movable jaw, 45, (shown by dotted lines, Fig. 7,) which is pressed outward by means of a coil-spring around arm 46 of the holder. The jaw 45 is furnished at the inner end of its slide with a projection that bears against the inner side of a curved lever, 47, which is pivoted at its lower end to the inside of the frame of the tier 41, while a second curved lever, 48, is arranged outside of the lever 47, which is pivoted to the frame of the tier 41, near its center, with one of its ends resting against a projection on the outside of lever 47, while its other end projects above the top of the tier, and is acted on by the curved flange 49 on the under side of the frame G, and by means of which, in connection with the levers 47 and 48, the jaw 45 of the band-holder is operated. The arm 46 of the band-holder is secured at its inner end in a pivot-bar, 50, that extends across the frame of the tier, and in which it has bearings, so that the band-holder can swing downward as the band is drawn around the knot-former V, while a coil spring, 51, is arranged around the pivot-bar 50, which throws up the band-holder 44 to the upper part of the tier when the band is released. The lever 47 is curved to conform to the arc through which the arm 46 of the band-holder swings, so that the jaw 45 can be opened with equal facility in whatever position the band-holder is placed.

A knife or cutter, 52, the blade of which is curved in sickle form, is arranged beneath the frame G on the lower end of a spindle, 53, which passes through a hollow standard, 55, projecting upward from the frame G. The cutter is operated by a pin, 54, projecting from the top of the tier 41, which strikes the shank of the cutter 52, and swings the curved blade thereof around, and severs the twine after the ends of the band have been grasped by the band-holder 44. The cutter is thrown back into position by means of the spiral spring 56, one end of which is secured to the head-piece 57 of the spindle 53, the other end being attached either to the standard 55 or to the frame G.

As the tier 41 starts, the band-holder comes in contact with the lip 58, which presses back the catch-finger X in the head of the band-arm O, and releases the end of the band, which is now held by the band-holder 44. When the band-holder has passed the lip 58, the catch-finger is thrown forward by a spring, 59, and catches and holds the end of the twine when the band is cut off, and retains it to form a band for the next gavel. Just previous to the band being seized by the band-holder 44, the pin 60 in the top of the tier strikes a lug, 61, on the band-tightener N, and swings the latter outward, thereby taking up all slackness of the band, and drawing it closely about the sheaf.

As soon as the band has been tightened the band-holder 44 seizes the ends of the band, as before stated, and the tier moving around the spindle winds the band around the lower end of the knot-former V, which has previously descended into the opening in the guard T. The knot-former V is operated up and down through the center of the hollow spindle 42, its upper part being supported by a standard, 62, above the frame G, while it receives its motion from a cam-groove, 63, in the side of gear 39. A slide, 64, is clamped to the rod of the knot-former V by a set-screw, 65, by means of which the knot-former may be accurately adjusted to the proper position. The slide 64 is furnished with a stud, 66, at its front side, upon which is hung the connecting-piece 67, at the lower end of which is arranged the pin or roll 68, which travels in the cam-groove 63. A rod, 69, extends from the connecting-piece 67 to one of the upright standards on the frame G, which takes the strain from the cam and reduces the friction of the parts.

The tier with the end of the band makes two revolutions around the knot-former V in forming the knot. At the first revolution the band is wound around the rod of the knot-former, above the thumb 70. (See Fig. 8.) The knot-former V is then slightly raised, so that the second revolution of the tier winds the band around the hook 71, upon the lower end of the rod V. The rod V is then raised, and the projection at the rear of the looping-dog 72, striking against the side of the hollow spindle 42, is crowded in, thereby pressing the thumb 70 firmly down upon the band, where it is wound into the hook 71, and, as the rod V continues to rise, the loop of the band, which is in the hook 71 of the knot-former, is drawn through the loop formed around the rod by the first revolution of the tier, which latter loop is pushed off from the end of the rod as it rises by the shoulder 73, at the under side of the flanged head 43, and the loop is drawn up by the hook 71, forming a close knot, like the one shown in Fig. 13 of the drawings. When the knot-former V has risen far enough to allow the projection at the back of the looping-dog 72 to fall into the recess in the side of the spindle 42, the pressure is removed from the thumb 70, which holds the loop, and the latter slips from the hook 71, the operation of tying the band being completed.

The knot is now free, the band-holder 44 having previously released its hold from the ends of the band, which was effected immediately after the loop was grasped by the thumb 70, the jaw having been opened by the levers 47 and 48, in connection with the curved flange 49, as before stated.

At the forward end of the curved flange 49 is an oscillating guide, 74, pivoted near its center to the under side of the frame G, above the tier 41, by the bolt 75.

The forward end of the guide 74 is made pointed, while the rear end is made broad, as shown in Fig. 7, so that at the first revolution of the tier 41 the top end of the lever 48 passes inside of the guide 74, and along the inside of the curved flange 49, the end of the lever 48 receiving no pressure.

The rear end of the guide 74 is pressed outward as the top of lever 48 passes it, which swings the point of the guide nearer to the center, around which the tier revolves, so that, at its second revolution, the top of lever 48 passes outside of the guide 74 and flange 49, whereby the lever 48 is pressed back, and the jaw 45 of the band-holder 44 is opened to release the ends of the band when the knot is formed, as before stated. The lever 48, in passing on the outside of the guide 74, presses in its rear end, thereby throwing out its point again, so that, on its first revolution to form the knot, the lever will again pass at the inner side. Small lips are formed at each side of the rear end of the guide 74, which strike the end of the flange 49, and prevent the guide from swinging too far, while upon the frame G is arranged a spring, 76, that acts on the guide 74 by means of a friction-pin, which passes down through the frame G and rests upon the upper side of the guide 74, which is provided with two depressions, one near each edge, into one of which the pin is forced by the spring 76 when the guide-piece 74 is moved to its full extent in either direction, thus retaining the guide-piece in its adjusted position until changed by the action of the machine. After the band is tied the inclosing-arms P and Q swing down, and release the sheaf, which is thrown from the machine by the fork Z, which projects back from the front of the binder, and upon which the bundle is thrust when it is inclosed by the arms P an Q.

The head of the fork Z travels in the slotted guide 77, which projects from the left-hand side of the machine, and it is provided with a short arm, 80, projecting from one of its sides, which is pivoted to the upper end of a swinging arm, 78, and by means of which, in connection with a horizontal lever, 79, beneath the platform H, the fork Z is operated. The arm 78 is pivoted at its lower end to the frame I of the binder, and the lever 79 is connected to it at about one-third of its length from its lower end by a double joint, so that when the lever 79 is operated by the pin 6, which strikes the projection 81 attached to the lever 79, the fork Z is thrown outward with great velocity, thereby discharging the sheaf from the auxiliary or binding platform H, the left-hand side H² of which is sloped or inclined downward to facilitate the operation.

To prevent the sheaf from sliding or moving back off from the discharging-fork Z when the arm Q is depressed, and before the lateral motion of the discharging-fork takes place, a spring safety-fork, 82, is arranged to work up through the platform H to hold the bundle or sheaf in place until the discharging-fork has commenced its lateral motion, when the fork 82 is forced down out of the way by the rear end of the inclosing-arm Q as it descends. When the fork 82 is forced down it is caught by the spring-dog 83, which holds it until the inclosing-arms are again raised, when the spring-dog 83 is thrown off by the end of arm 8, and the safety-fork is again thrown up by its spring 84.

Having described my improved machine for binding grain, what I claim therein as new and of my invention, and desire to secure by Letters Patent, is—

1. The combination, with the main grain-platform B, rake C, and operating-chain b, of the hinged arms c d e and lever F, the parts being arranged in relation to each other substantially as and for the purposes set forth.

2. The combination, with the swinging lever F and dog i, of the movable end h of the grain-board, substantially as and for the purposes set forth.

3. The combination, with the auxiliary platform H, of a turning-fork, K, substantially as and for the purposes set forth.

4. The combination, with the turning-fork K, of the peculiar mechanism herein described for operating the same.

5. The construction and arrangement of the inclosing-arms P Q and compressing-chain L, substantially as and for the purposes set forth.

6. The combination, with the compressing-arms P Q, of the peculiar mechanism herein described for operating the same, consisting of the segment-gears, groove-cam q, arm 8, and rod 9, connected and arranged for operation substantially as set forth.

7. The combination, with one or more protecting-fingers, g, of a protecting and compressing-finger, 15, substantially as and for the purposes set forth.

8. The combination, with the band-arm O and auxiliary platform H H², of a band-hook, y, for drawing the band under and in front of the gavel or bundle, substantially as set forth.

9. The combination, with the tier, of a band-tightener, N, substantially as and for the purposes set forth.

10. The band-tier and band-cutting device, constructed and arranged as set forth.

11. The combination, with the band-arm O and the catch-finger X, of the lip 58 and spring 59 for catching and holding the band, substantially as shown and described.

12. The parts 44, 45, 46, 50, and 51, for clamping and holding the ends of the bands during the operation of tying the knot, combined and arranged substantially as and for the purposes set forth.

13. The combination, with the jaws 45 of the band-holder, of the levers 47 and 48 and curved flange 49, substantially as and for the purposes set forth.

14. The combination, with the curved flange 49 on the under side of frame G, of the oscillating guide 74 and lever 48, substantially as for the purpose set forth.

15. The combination, with the hollow spindle 42 of the tier, provided with a flanged head, 43, of the guard T and knot-former V, substantially as and for the purposes set forth.

16. The combination, with the rod of the knot-former V, of the hook 71 and dog 72, provided with a thumb, 70, substantially as and for the purpose set forth.

17. The combination, with the tier 41 and knot-former V, of the gear 39, provided with a cam-groove, 63, and connecting-pieces 64, 65, 66, 67, 68, and 69, arranged in relation to each other substantially as and for the purposes set forth.

18. The combination, with the frame G and tier 41, of the band-steadying fingers $o'$ $t'$ and angular guard $w'$, substantially as and for the purposes set forth.

19. The combination, with the guard T, of the guard-fringers 13 and 14, as and for the purposes set forth.

20. The arrangement, with the inclosing-arm P, of the compressing and guard finger 15 16, as and for the purposes set forth.

21. The combination, with the shipper-bar W, of the head-piece 17 and springs 38 and 39, substantially as and for the purposes set forth.

22. The combination, with the frame G and the shipper bar W, of the latch-piece X and spring 35, substantially as and for the purposes set forth.

23. The combination, with the segment 25 and clutch-guide 28, of the clutch-dogs 20 and 26, provided with projections $a^2$ $c^2$, substantially as and for the purposes set forth.

24. The combination, with the clutch-dog 20 and latch-piece X, of the spur $m^2$, as and for the purposes set forth.

25. The clutch-guard 28, provided with the projection 37 and stop-notch 30, as and for the purposes set forth.

26. The combination, with the band-arm O, band-tightener N, guide-eyes 11, and twine-spool S, of the band-supporting spring $v$, said parts being arranged in relation to each other as and for the purposes set forth.

27. The combination, with the auxiliary platform H H², of the spring safety-fork 82, substantially as and for the purposes set forth.

28. The construction and arrangement of the discharging-fork Z, and the mechanism for operating the same, substantially as and for the purposes set forth.

GEO. W. CHANDLER.

Witnesses:
  THOS. H. DODGE,
  ALBERT E. PEIRCE.